United States Patent
Schneider et al.

[11] Patent Number: 6,135,328
[45] Date of Patent: Oct. 24, 2000

[54] PRESSURE RELIEF MECHANISM FOR A DISPENSING DEVICE

[76] Inventors: Mark C. Schneider, 113 Somers Ave., Moorestown, N.J. 08057; Joseph B. Hanni, 302 Monroe Ave., Cherry Hill, N.J. 08002

[21] Appl. No.: 09/314,839

[22] Filed: May 19, 1999

[51] Int. Cl.[7] ................................................. G01F 11/00
[52] U.S. Cl. ......................................... 222/389; 222/326
[58] Field of Search ................................... 222/326, 340, 222/386, 387, 389

[56] References Cited

U.S. PATENT DOCUMENTS

| | | | |
|---|---|---|---|
| 3,327,906 | 6/1967 | Gomann | 222/389 |
| 3,768,472 | 10/1973 | Hodosh et al. | 128/319 |
| 4,134,523 | 1/1979 | Hansen et al. | 222/389 |
| 4,376,498 | 3/1983 | Davis, Jr. | 222/326 |
| 4,676,410 | 6/1987 | von Flue | 222/327 |
| 4,911,328 | 3/1990 | Keller | 222/47 |
| 5,181,636 | 1/1993 | Anderson et al. | 222/389 |
| 5,411,180 | 5/1995 | Dumelle | 222/137 |

*Primary Examiner*—Steven O. Douglas
*Attorney, Agent, or Firm*—Caesar, Rivise, Bernstein, Cohen & Pokotilow, Ltd.

[57] ABSTRACT

A pressure relief mechanism for devices such as a dispensing device, the dispensing device being of a type that includes a cylinder having a piston disposed therein, the piston including an opening which provides communication between a front portion of the cylinder and a rear portion of the cylinder. At least one driven rod is connected to the piston which extends through an end wall of the cylinder. The piston and its driven rod are driven in an ejecting direction in response to pressure provided within the rear portion of the cylinder. The pressure relief mechanism includes an elongated return rod that is actuable from outside the cylinder. The return rod has a length extending through the piston and is provided for engaging and moving the piston in a return direction. The pressure relief mechanism also includes a sealing device disposed within the rear portion of the cylinder. The sealing device is fixedly secured to an end of the return rod and normally covers the piston aperture to prevent pressure flow across the piston when driven in the ejecting direction. The return rod is actuable to remove the sealing means from the piston to uncover the piston opening thus permitting pressure to pass across the piston to the front portion of the cylinder thus enabling effortless movement of the piston in the return direction in response to actuation by the return rod.

21 Claims, 4 Drawing Sheets

PRESSURE RELIEF MECHANISM FOR A DISPENSING DEVICE

BACKGROUND OF THE INVENTION

This invention relates to a unique pressure relief mechanism that may be useable in different types of devices and typically may be used in devices for dispensing compositions such as caulking materials, grease, automotive windshield sealant, dual component reactive resins, and the like. In a particularly preferred application, the unique pressure relief mechanism is employed in a dispensing device such as a caulking gun. In devices for dispensing such compositions, it is well known to employ a pressure medium driven cylinder/piston unit. Pressure, introduced into the cylinder behind the piston, drives the piston in a forward, linear direction to dispense fluids. Introduction of pressure behind the piston is controlled by actuation of a trigger on the dispensing device. Once the piston has moved its full travel forward, ejecting all of the material from the cartridge, in order to remove the previously emptied cartridge and insert a fresh cartridge into the dispensing device, it is necessary to return the piston. Upon release of the trigger, a pressure relief valve, located within the handle, opens automatically to allow the pressure introduced behind the piston to escape to ambient atmosphere. However, the rate at which this pressure escapes through the relief valve is relatively slow, thus making it difficult for the user to return the piston rapidly and easily to facilitate rapid reloading.

In previously known dispensing devices, in order to return the piston to its initial or returned position upon the completion of a caulking operation, valving structures have been provided to enable the piston to be forced backwards to its initial or returned position by means of air pressure. Hodosh et al. (U.S. Pat. No. 3,768,472) discloses a fluid dispensing gun including an automatic ball-check-valve 150 which permits gas in chamber 44 to freely pass into chamber 42 as the piston is returning, thus permitting relatively rapid movement of the piston as it returns.

OBJECTS OF THE INVENTION

Accordingly, it is a general object of this invention to provide a pressure relief mechanism which overcomes the disadvantages of the prior art.

It is a further object of this invention to provide a pressure relief mechanism which is inexpensive to manufacture.

It is a further object of this invention to provide a pressure relief mechanism that is simple in construction.

It is a further object of this invention to provide a pressure relief mechanism that may be manually actuated.

It is a further object of this invention to provide a pressure relief mechanism that decreases resistance resulting from built-up air pressure when moving a piston to a returned position.

It is a further object of this invention to provide a pressure relief mechanism that will automatically seat itself against the piston to prevent the rapid release of built-up air pressure from behind the piston when the piston moving in the forward direction or during dispensing.

SUMMARY OF THE INVENTION

These and other objects of this invention are achieved by providing a pressure relief mechanism that may be useable in different types of devices and typically may be used in devices for dispensing compositions such as caulking materials, grease, automotive windshield sealant, dual component reactive resins, and the like. Such a dispensing device is of a type that includes a cylinder having a piston disposed therein, the piston including an opening which provides communication between a front portion of the cylinder and a rear portion of the cylinder. At least one driven rod is connected to the piston which extends through an end wall of the cylinder. The piston and its driven rod are driven in an ejecting direction in response to pressure provided from within the rear portion of the cylinder. The pressure relief mechanism includes an elongated return rod that is actuable from outside the cylinder. The return rod has a length extending through the piston and is provided for engaging and moving the piston in a return direction. The pressure relief mechanism also includes a sealing means disposed within the rear portion of the cylinder. The sealing means is fixedly secured to an end of the return rod and normally covers the piston aperture to prevent pressure flow across the piston when driven in the ejecting direction. The return rod is actuable to remove the sealing means from the piston to uncover the piston opening thus permitting pressure to pass across the piston to the front portion of the cylinder thus enabling effortless movement of the piston in the return direction in response to actuation by the return rod.

DESCRIPTION OF THE DRAWINGS

Other objects and many attendant features of this invention will become readily appreciated as the same becomes better understood by reference to the following detailed description when considered in connection with the accompanying drawings wherein.

DETAILED DESCRIPTION OF THE PREFERRED EMBODIMENTS

Figure 1:
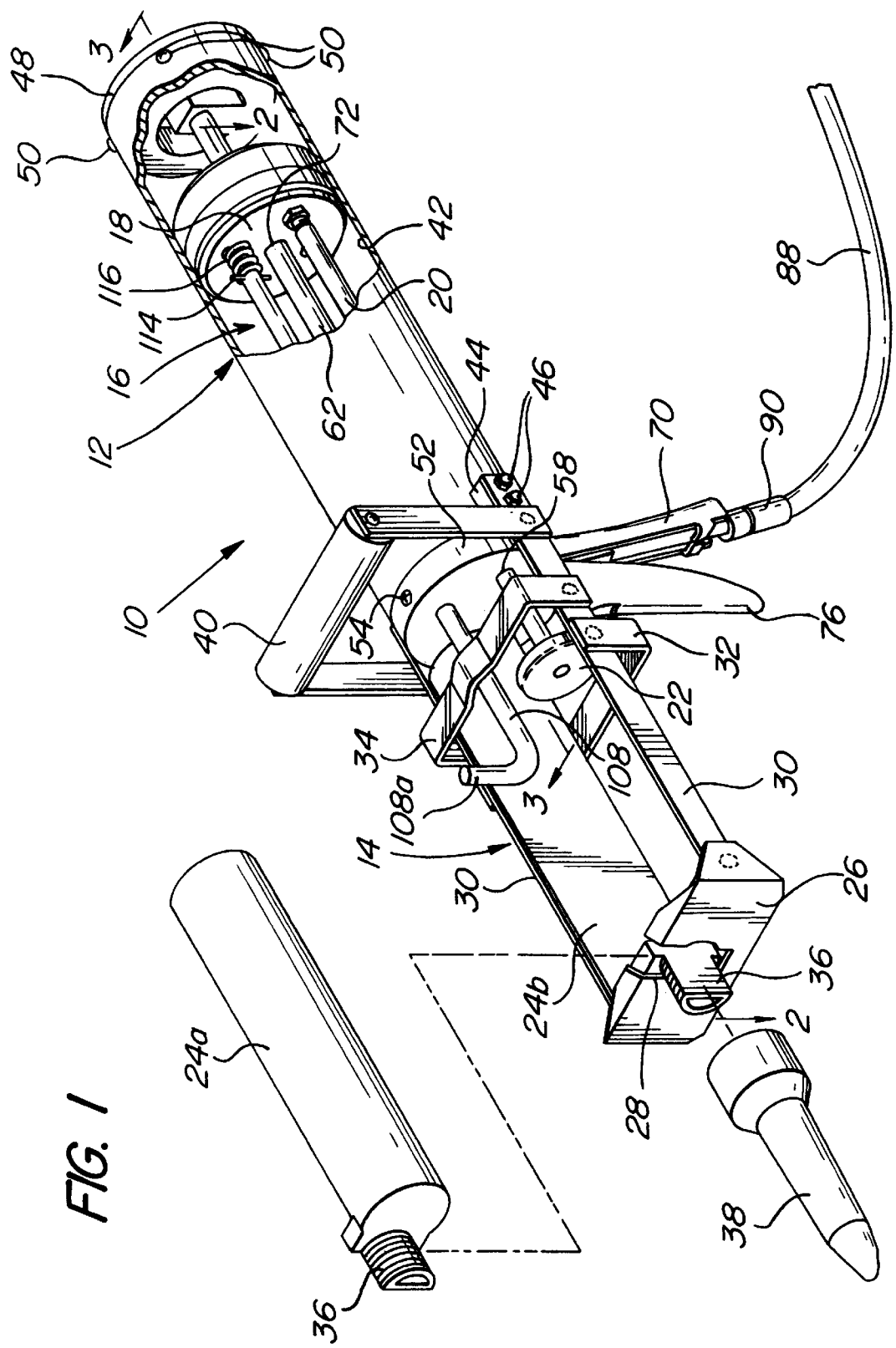
FIG. 1 is an isometric view, partially in section, of a dispensing device which includes the preferred embodiment of the pressure relief mechanism of the present invention.
Figure 2:
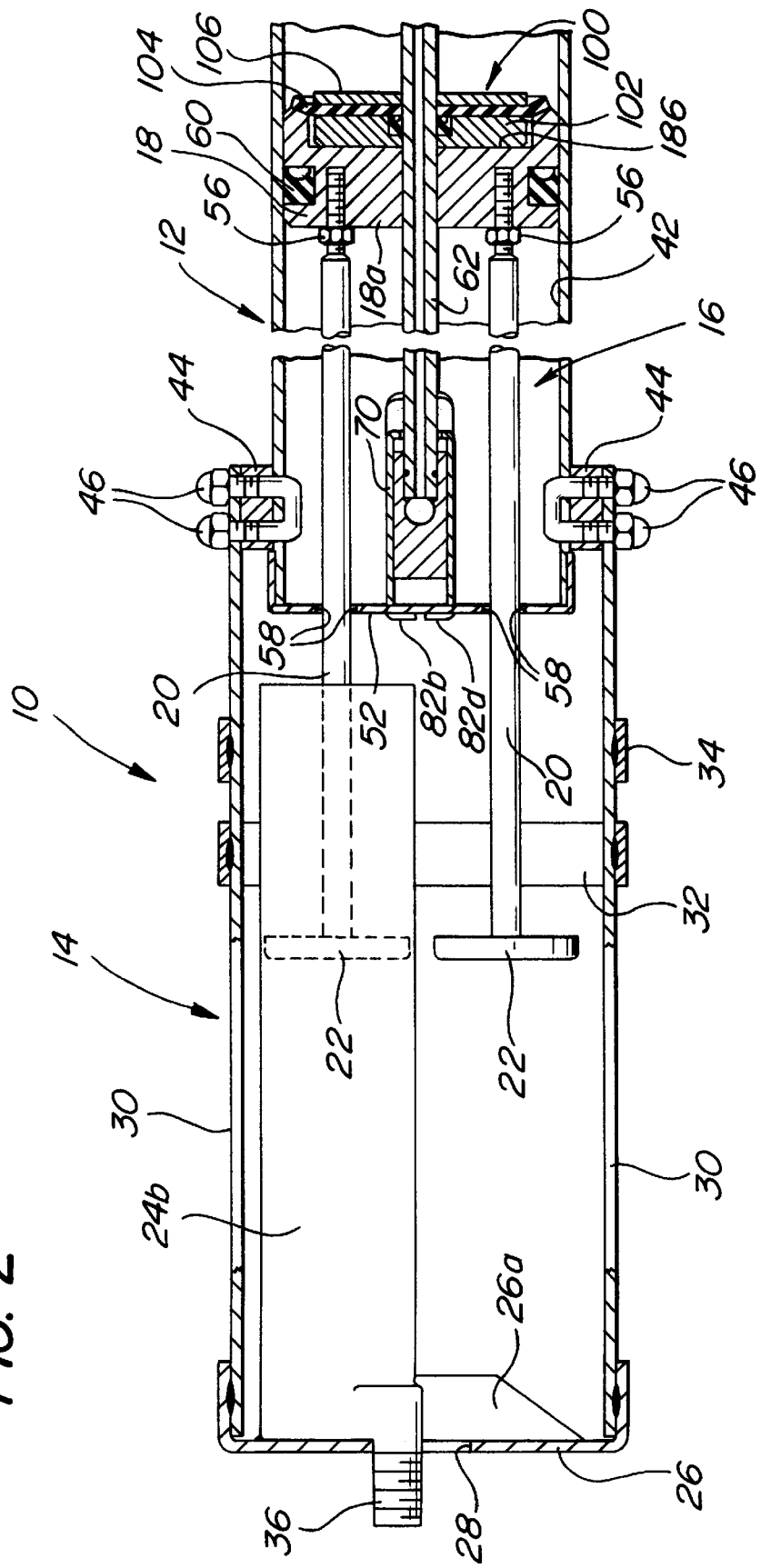
FIG. 2 is an enlarged, sectional view taken along line 2—2 of FIG. 1.

Referring now to the drawings, a device for dispensing materials in accordance with the present invention is shown generally at 10 in FIGS. 1 and 2. The dispensing device includes a rearward driving section 12 employing a unique pressure relief mechanism in accordance with the present invention and a forward section in the form of a dual component carriage assembly 14 of conventional design for housing a composition to be dispensed. The rearward driving section 12 includes an air cylinder assembly 16 within which there is positioned a piston 18. As best shown in FIGS. 1 and 2, the piston 18 operates two driven rods 20 which terminate in ejector rams 22.

It should be understood that the carriage assembly 14 can be of any desired construction for housing a composition to be dispensed and does not constitute a limitation on the present invention. For example, although the embodiment chosen for illustration herein includes the composition in a dual disposable and replaceable hard cartridges or containers 24a and 24b, the dispensing devices incorporating this invention can also include a fixed and permanent container for receiving material to be dispensed that initially is packaged in bulk form, or for receiving material to be dispensed from a flexible, sausage-type cartridge. Moreover, all of these latter-mentioned options (i.e., hard cartridge, bulk form and sausage-type cartridge) can be employed in single component dispensing devices as well as in dual component dispensing devices as shown in the drawings herein.

Referring again to FIGS. 1 and 2, the carriage assembly 14 includes at its forward end a component support bracket 26 having an opening 28 positioned centrally thereof The component support bracket 26 is joined to a pair of elongate support members 30 by any suitable means, e.g., welding. The carriage assembly further includes a lower stirrup 32 and an upper stirrup 34 which are provided to assist in supporting a dual component cartridge package comprised of two cartridges 24a and 24b adapted to be positioned within the carriage assembly 14 with the rear portion of the cartridges 24a and 24b resting upon the lower stirrup 32 and the forward portion of the cartridges resting upon a support flange 26a (FIG. 2) located on the bottom of the component support bracket 26. The forward portion of the cartridges 24a and 24b include a semicircular threaded ejection nozzle 36. When the two cartridges 24a and 24b are positioned in a side-by-side relationship within the carriage assembly 14, the two semicircular nozzles 36 come into abutting relationship with each other to provide a resulting circular threaded nozzle. Thus, during ejection, the different components contained within each of the cartridges 24a and 24b are caused to intermix with one another as they are ejected from the nozzle 36. A threaded ejection nozzle 38 may be threaded upon the semicircular nozzles to hold the two component cartridges together. As shown in FIGS. 1 and 2, the ejection nozzle 38 can be a continuous extension of the cartridges 24a and 24b, in which case it is received within the opening 28 of the component support bracket 26 in a conventional manner. Alternatively, the ejection nozzle 38 can be formed as part of the component support bracket 26, in alignment with a dispensing opening provided in the end wall of each cartridge 24a and 24b. The dispensing device 10 is also provided with a carrying handle 40 that is secured to the carriage assembly 14 by any suitable means, e.g., welding. The carrying handle 40 is positioned centrally over the caulking gun for balance when handling the caulking gun.

Figure 3:
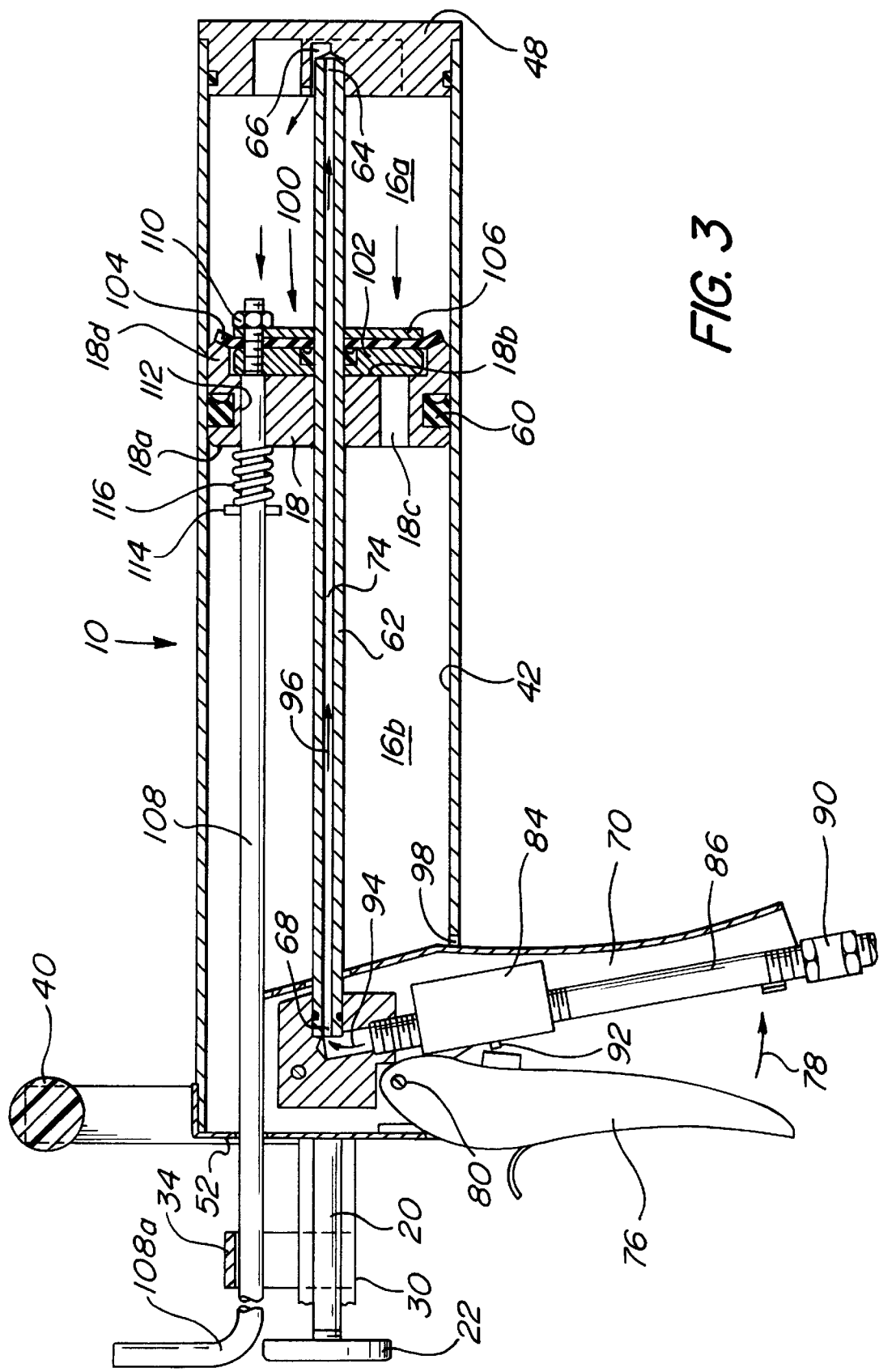
FIG. 3 is an enlarged, sectional view taken along line 3—3 of FIG. 1.

Referring now to FIG. 2, there is shown in section the internal components of the dispensing device including the pressure relief mechanism of the present invention. The air cylinder assembly 16 includes a cylindrical wall 42. The carriage assembly 14 is secured to the outer surface of the cylinder wall 42 by spacers 44 and appropriate hardware 46. As best shown in FIGS. 1 and 3, at its rear portion, the cylindrical wall 42 is secured to a rear bulkhead 48 or end wall by any suitable means, e.g., retaining screws 50. Referring now to FIGS. 1 and 2, at its forward end, the cylindrical wall 42 terminates in a forward bulkhead 52 or end wall and is secured thereto by any suitable means, e.g., retaining screws 54. As previously mentioned, disposed within the air cylinder assembly 16 is a piston 18 which operates two driven rods 20 that terminate in ejector rams 22. At the end opposite the ejector rams 22, each driven rod 20 is provided with hardware, e.g., a securing nut 56, to enable securement of the driven rod 20 within the piston 18. Referring now to FIG. 2, each driven rod 20 chosen for illustration herein is a smooth-surfaced rod of a generally circular cross-section, and each rod extends through a generally circular-shaped opening 58 located in the forward bulkhead 52. The piston 18 is arranged for movement within the air cylinder assembly 16 in a forward ejecting direction. When moved in this direction, the driven rods 20 move forward to dispense the components from the cartridges 24a and 24b through the ejection nozzle 38. The piston 18 is also arranged to be moved in the opposite direction to a fully returned position wherein the piston 18 engages with the rear bulkhead 48 to enable the removal of the previously emptied cartridges and the insertion of fresh cartridges.

Figure 5:
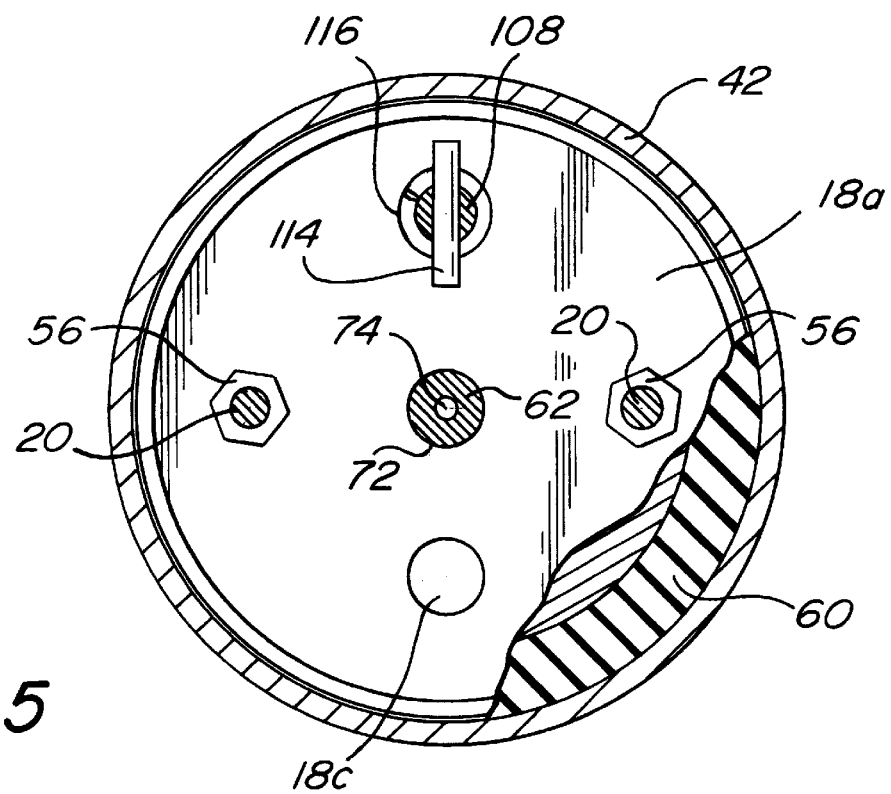

As best shown in FIGS. 1, 3 and 5, the piston 18 is circular in shape and includes a fore wall 18a, an aft wall 18b and a through valve opening 18c. The piston further includes an associated seal 60 of conventional design, e.g., a U-cup, o-ring, a leather seal, metal ring or glide ring, located in a land formed on the outer circumference of the piston 18. The seal 60 prevents air from passing between the piston 18 and the cylindrical wall 42 during movement of the piston 18 in the forward ejecting direction and in the opposite, returning direction. Referring now to FIG. 3, also positioned within the air cylinder assembly 16 is a piston guide tube 62, the first end 64 of which is disposed within an opening 66 in the rear bulkhead 48, the second end 68 of the guide tube 62 being secured within an opening in the handle 70. The piston guide tube 62 extends through a close-tolerance, generally circular-shaped opening 72 located in the approximate center of the piston 18 thus enabling movement of the piston over the piston guide tube 62 in the forward ejecting direction. The piston guide tube 62 also includes an internal passageway 74 that allows for the passage of pressurized gas therethrough.

Referring now to FIGS. 1 and 3, it should be understood that the piston 18 is driven in the forward ejecting direction by actuation of a trigger 76 in a direction toward the handle 70, as indicated by arrow 78 in FIG. 3. The trigger 76 is pivotally mounted to the handle 70 by any suitable means, e.g., a pivot bolt 80 passing through the handle 70 and a nut (not shown). It should be understood that the pivot bolt 80 could be replaced with a pivot pin or any other desired pivot support. The trigger 76 is spring loaded away from the handle 70 by a conventional torsional spring (not shown). As best shown in FIG. 2, the handle 70 is secured to the forward bulkhead 52 by means of bent tabs 82a and 82b that extend through openings in the forward bulk head 52.

Referring now to FIG. 3, disposed within the handle 70 is an air valve assembly 84 which controls the passage of air from an external air pressure supply (not shown) into the dispensing gun 10. The air valve assembly 84 is in communication with the internal passageway 74 of the piston guide tube 62 and also is in communication with the air pressure supply (not shown) through an air pressure supply tube 86, also disposed within the handle 70. The air pressure supply tube 86 may be connected to the air pressure supply (not shown) by connection of an appropriate air hose 88 (FIG. 1) arranged to connect to an air hose coupling 90 (FIG. 1), disposed proximate to the handle 70. The air valve assembly 84 further includes an activation button 92 (FIG. 3) that is of the type that is actuated by depression of the trigger 76.

In operation, when the trigger 76 is depressed, the valve assembly 84 is activated to permit air pressure from the air pressure supply (not shown) to pass through the valve assembly 84 and into the piston guide tube 62 as indicated by the arrow 94. As previously mentioned, the piston guide tube 62 is provided with an internal passageway 74 to permit the passage of the pressurized gas, e.g., air, therethrough in the direction indicated by the arrow 96. As shown in FIG. 3, the second end 64 of the guide tube 62 terminates in an opening 66 in the rear bulkhead 48. The opening 66 permits the pressurized gas to flow freely from the second end 64 of the guide tube 62 into a rear portion 16a of the air cylinder 16, the rear portion 16a being that portion of the air cylinder 16 between the piston 18 and the rear bulkhead 48. Parenthetically, the air cylinder 16 also includes a front portion 16b defined as being that portion of the air cylinder 16 between the piston 18 and front bulkhead 52. In this manner, gas pressure within the rear portion 16a of the air cylinder 16 forces the piston 18 to travel in the forward direction. The driven rods 20, operating through the ejector rams 22, cause the dual component material to be extruded from the cartridges 24a and 24b, mixed and ejected from the caulking gun. During the forward movement of the piston 18, air within the front portion 16b of the cylinder 16 is vented to the outside atmosphere through an opening 98 as well as through the opening 58 to enable continued forward movement of the piston 18.

Figure 4:
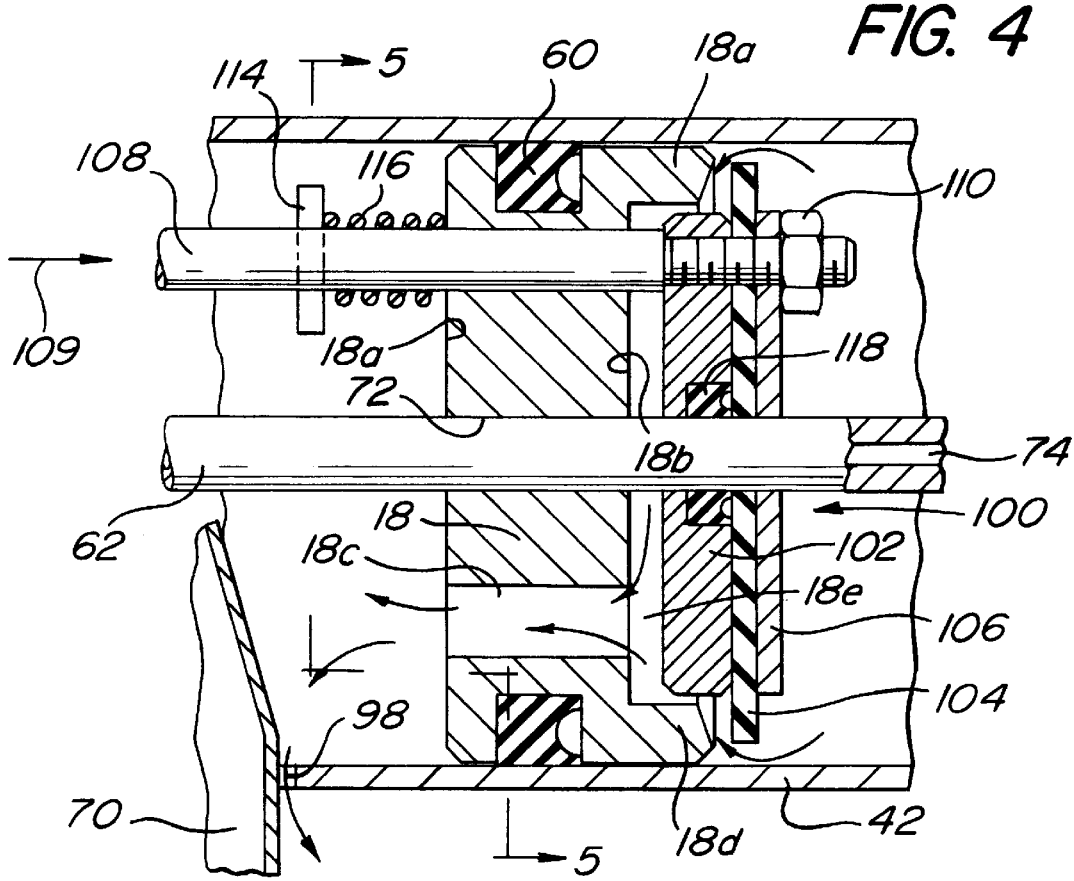
FIG. 4 is a detail view demonstrating operation of the pressure relief mechanism of the present invention; and, FIG. 5 is an enlarged, sectional view taken along line 5—5 of FIG. 4.

Once the piston 18 has moved through a desired travel stroke for ejecting most of the material from the dual component cartridges 24a and 24b, a sealing valve assembly 100 may be actuated to enable the piston 18 to be moved relatively easily in the opposite direction and returned to the fully returned position thus enabling removal of the previously emptied cartridges 24a and 24b from the carriage assembly 14 and insertion of fresh cartridges. Referring now to FIGS. 2, 3 and 4, the sealing assembly 100 includes a fitting 102 including a seal 118, a seal 104 and a metal washer 106, these three components being secured to the threaded distal end of an elongated return rod 108 by any suitable means, e.g., a securing nut 110. The distal end of the return rod 108 extends through a close-tolerance, generally circular-shaped opening 112 extending through the piston 18. As best shown in FIG. 1, the return rod 108, near its proximal end, extends through a generally circular-shaped opening located on the front bulkhead 52. At its proximal end, the return rod 108 is provided with a bend 108a of approximately 90 degrees to facilitate manual actuation by a user. Further, the return rod 108 is provided with a shoulder 114 (FIG. 3). A compression coil spring 116 (FIG. 3), located between the shoulder 114 of the return rod 108 and the fore wall 18a, of the piston 18 serves to normally bias the components of the sealing assembly 100 against the piston aft wall 18b. Specifically, the seal 104 comes into contact with flanges 18d extending rearwardly from the piston 18 which results in a complete sealing off of the through opening 18c in the piston 18. Thus, pressurized gas from within the rear portion 16a of the air cylinder 16 is prevented from passing through the through opening 18c in the piston. In this manner, during dispensing of the components from the cartridges 24a and 24b, pressurized gas entering the rear portion 16a of the air cylinder assembly 16 will be prevented from escaping to the front portion 16b of the air cylinder assembly 16 through the piston opening 18c.

Conversely, once the piston 18 has moved through a desired travel stroke, it may be moved in the opposite direction and returned therefrom by actuation of the return rod 108. In particular, referring now to FIG. 4, manual actuation of the return rod 108 in the direction indicated by arrow 109 causes the shoulder 114 to compress the coil spring 116 thus causing the components of the sealing assembly 100, i.e., the fitting 102, the seal 104, the seal 118 and the washer 106, to move away from the aft surface 18b, of the piston to a spaced apart relationship therewith. With the sealing assembly 100 moved away from the aft surface 18b, of the piston 18, the back pressure of gas accumulated within the rear portion 16a (FIG. 3) of the air cylinder assembly 16 can rapidly escape to the forward portion 16b of the air cylinder assembly 16 through the unsealed through opening 18c of the piston along the path indicated by the arrows shown in FIG. 4, and then to the ambient surroundings. Thus, the piston 18 may be returned easily until it engages with the rear bulkhead 48 to enable removal of previously emptied cartridges 24a and 24b and the insertion of fresh cartridges. When the return rod 108 is no longer actuated, the compression coil spring 116 acts to bias the sealing assembly 100 against the piston aft wall 18b, thus covering the through opening 18c in the piston 18 to prevent any further passage of gas through the opening 18c thus readying the device for dispensing of the fresh cartridges.

The fitting 102 may be formed of any suitable material, e.g., plastic, and includes a central opening through which the guide tube 62 is disposed. The fitting 102 is generally circular in shape and acts as a backer to the seal 104 to assist the seal 104 in forming an air-tight seal against the flange 18d. The fitting 102 is also sized to cover the opening 18c and prevent leakage of pressurized gas therethrough when the sealing assembly 100 is in the normal covering position. The fitting 102 further includes an associated seal 118 located in a cylindrical opening formed on the inner circumference of the central opening. In this manner, the seal 118 prevents pressurized gas from escaping between the central opening of the fitting 102 and the guide tube 62 as the fitting 102 travels thereover. The seal 104 is formed of any suitable resilient material, e.g., rubber, and further prevents leakage of pressurized air through the piston 18 during movement of the piston 18 in the forward ejecting direction. The washer 106 may be formed of any suitable material, e.g., metal. Both the seal 104 and the washer 106 include a close-tolerance central opening through which the guide tube 62 is disposed.

The device of the present invention has been described in respect to the particular embodiment thereof set forth in the specification and as illustrated in the drawings. As a result of such disclosure, other variations and modifications may become apparent to those skilled in the art and therefore, no limitation as to the scope of the invention is intended by the specific embodiments disclosed but the scope of the invention is to be interpreted in view of the appended claims.

What is claimed is:

1. A device including a pressure relief mechanism, the device comprising:

a. a hollow cylinder having a front end wall and a rear end wall spaced apart in the axial direction of the cylinder;

b. a piston displaceably mounted within the cylinder and adapted to reciprocate between a forward ejecting direction and a return direction and including a through opening therethrough providing communication between a front portion of said cylinder and a rear portion of said cylinder;

c. at least one driven rod connected to said piston, said driven rod extending through the front end wall of said cylinder;

d, means located within the cylinder for supplying a pressure medium within the rear portion of the cylinder for slidably displacing the piston in the forward ejecting direction;

e. a sealing assembly disposed within said rear portion of said cylinder, said sealing assembly normally disposed in a covering position over said through opening to prevent pressure flow through said through opening during movement of said piston in the forward ejecting direction; and, f. an elongated return rod having a proximal end and a distal end, said sealing assembly being secured to said distal end, said return rod being manually actuable in the return direction from outside said cylinder to remove said sealing assembly from said covering position to a spaced-apart position with respect to said piston thus permitting said pressure medium to pass through said through opening from the rear portion of said cylinder to the forward portion of said cylinder to enable easy movement of said piston in the return direction, said return rod also provided with means for engaging and moving said piston in said return direction.

2. The device of claim 1 wherein said at least one driven rod comprises two driven rods each extending through said front end wall, each driven rod terminating in an ejector ram, said device further comprising a carriage means carried by said front end wall, said carriage means arranged for the exchangeable holding of a pair of cylindrically shaped cartridges provided with dispensing plungers, said ejector rams being provided for driving forward the plungers in an axial direction to dispense a substance from each said cartridge.

3. The device of claim 1 wherein said means for supplying a pressure medium comprises a hollow guide tube having first and second ends disposed within said cylinder, said guide tube extending through a central bore in said piston and through a central bore in said sealing assembly, said guide tube comprising a first end and a second end, the first end of said guide tube communicating with a pressure source, the second end of said guide tube communicating with the rear portion of said cylinder to provide pressure therein.

4. The device of claim 3 additionally comprising an air valve to selectively port said pressure source to the first end of said guide tube to selectively move said piston and associated driven rods and ejector rams axially upon said guide tube in said eject direction.

5. The device of claim 4 wherein said pressure source is external to said device and detachably connected thereto.

6. The device of claim 5 wherein said pressure source is a source of air pressure.

7. The device of claim 6 wherein said device is arranged for dispensing high viscosity compositions.

8. The device of claim 3 additionally comprising a seal located within said central bore of said sealing assembly wherein said seal is journaled upon said guide tube to prevent air flow across said sealing assembly as said piston moves in the eject direction.

9. The device of claim 1 wherein said piston includes a seal concentrically thereof and where said seal is journaled upon said cylinder.

10. The device of claim 9 wherein said seal includes air seal means interacting between said seal and said cylinder to prevent air flow across said piston as said piston moves in the eject and return directions.

11. The device of claim 1 wherein said means for engaging and moving said piston in said return direction comprises a shoulder disposed on the length of said return rod, said shoulder provided for engaging said piston for movement in said return direction.

12. The device of claim 11 wherein said shoulder is disposed on said return rod within the forward portion of the cylinder.

13. The device of claim 12 additionally comprising a biasing means disposed on said return rod between said shoulder and said piston, said biasing means provided for normally biasing said sealing assembly in said covering position over said through opening.

14. The device of claim 13 wherein said biasing means is disposed within the forward portion of the cylinder.

15. The device of claim 14 wherein said biasing means comprises a coil spring.

16. The device of claim 1 wherein the distal end of said return rod includes threads and wherein said sealing assembly is fixedly secured to said return rod by means of a securing nut threaded onto said return rod.

17. The device of claim 1 wherein said sealing assembly comprises a fitting, a seal and a washer all affixed at the distal end of said return rod.

18. The device of claim 1 wherein the proximal end of said return rod is bent to facilitate actuation by a user of said dispensing device.

19. A device including a pressure relief mechanism, the device comprising:

a. a hollow cylinder having a front end wall and a rear end wall spaced apart in the axial direction of the cylinder;

b. a piston displaceably mounted within the cylinder and adapted to reciprocate between a forward ejecting direction and a return direction and including a through opening providing communication between a front portion of said cylinder and a rear portion of said cylinder;

c. at least one driven rod connected to said piston, said driven rod extending through the front end wall of said cylinder;

d. a pressure-medium conveying member communicating with the interior of the cylinder for supplying a pressure medium to the rear portion of the cylinder for slidably displacing the piston in the forward ejecting direction;

e. a sealing assembly disposed within said rear portion of said cylinder, said sealing assembly being disposed in a covering position over said through opening to prevent pressure flow through said through opening during movement of said piston in the forward ejecting direction; and, f. an elongated return rod having a proximal end and a distal end, said sealing assembly being secured to said distal end, said return rod being manually actuable in the return direction from outside said cylinder to remove said sealing assembly from said covering position to a spaced-apart position with respect to said piston thus permitting said pressure medium to pass through said through opening from the rear portion of said cylinder to the forward portion of said cylinder to enable easy movement of said piston in the return direction, said return rod also provided with means for engaging and moving said piston in said return direction.

20. The device of claim 19, further including a spring member for normally maintaining the sealing assembly in a covering position over said through opening.

21. The device of claim 20, wherein the member for supplying a pressure medium within the rear portion of the cylinder is a hollow member located within the interior of the cylinder.

* * * * *